(12) United States Patent
Hoffmann et al.

(10) Patent No.: US 12,576,760 B2
(45) Date of Patent: Mar. 17, 2026

(54) METHOD AND DEVICE FOR MOUNTING A HEADREST FOR A VEHICLE SEAT

(71) Applicant: GRAMMER AG, Ursensollen (DE)

(72) Inventors: Markus Hoffmann, Kümmersbruck (DE); Johannes Raab, Schwandorf (DE)

(73) Assignee: GRAMMER AG, Ursensollen (DE)

( * ) Notice: Subject to any disclaimer, the term of this patent is extended or adjusted under 35 U.S.C. 154(b) by 263 days.

(21) Appl. No.: 18/216,154

(22) Filed: Jun. 29, 2023

(65) Prior Publication Data

US 2024/0010109 A1 Jan. 11, 2024

(30) Foreign Application Priority Data

Jul. 7, 2022 (DE) ..................... 10 2022 116 985.5

(51) Int. Cl.
B60N 2/58 (2006.01)
B60N 2/70 (2006.01)
B60N 2/80 (2018.01)

(52) U.S. Cl.
CPC ......... B60N 2/5891 (2013.01); B60N 2/7017 (2013.01); B60N 2/80 (2018.02); B60N 2002/899 (2018.02)

(58) Field of Classification Search
CPC .......... A47C 1/036; A47C 1/38; A61G 5/121; A61G 15/125; B60N 2/80; B60N 2/5891; B60N 2/7017; B60N 2002/899
USPC .................................................. 297/391–410
See application file for complete search history.

(56) References Cited

U.S. PATENT DOCUMENTS

| | | | |
|---|---|---|---|
| 2,621,712 A | * | 12/1952 | Davies ................. B60N 2/5891 267/84 |
| 5,126,004 A | | 6/1992 | Suenens |
| 5,681,088 A | | 10/1997 | Takei |
| 11,453,321 B2 | | 9/2022 | Kober |

(Continued)

FOREIGN PATENT DOCUMENTS

| | | |
|---|---|---|
| CN | 201389734 Y | 1/2010 |
| CN | 201592333 U | 9/2010 |

(Continued)

OTHER PUBLICATIONS

Exerpt of German Office Action of DE102022116985.5 Dated Feb. 15, 2023, 1 Page.
Chinese Search Report Dated Oct. 30, 2025, 2 Pages.

*Primary Examiner* — Jose V Chen
(74) *Attorney, Agent, or Firm* — LUCAS & MERCANTI, LLP; Klaus P. Stoffel

(57) ABSTRACT

A method for the semi-automated assembly of a headrest for a vehicle seat, including the following method steps: feeding a cover stretched in a holder of the headrest to a conveying device, which cover includes an opening, such that an edge region of the opening is held open by the holder in such a way that a head box can be inserted into an inner space of the cover; transporting the holder in the conveying device to at least one workstation; feeding and mounting of an uphol-stered part; orienting seam edges of the cover; automatic assembly of a head box assembly in an inner space of the pocket-like cover; closing the opening of the cover; remov-ing the headrest from the holder; removing the holder from the conveying device; and performing an ironing process.

24 Claims, 10 Drawing Sheets

(56)                    References Cited

U.S. PATENT DOCUMENTS

| 11,741,270 | B2 * | 8/2023 | Attar | ........................ G06F 30/20 |
| | | | | 703/1 |
| 2005/0225144 | A1 | 10/2005 | Kluhspies | |
| 2012/0261967 | A1 | 10/2012 | Ahlbrand | |
| 2017/0306543 | A1 * | 10/2017 | Sekino | ................. B60N 2/5891 |

FOREIGN PATENT DOCUMENTS

| CN | 205166322 | U | | 4/2016 | |
| CN | 108527820 | A | * | 9/2018 | ............. B60N 2/809 |
| CN | 112676796 | A | | 4/2021 | |
| DE | 19633749 | B4 | | 3/2005 | |
| DE | 102009012616 | A1 | * | 9/2010 | ............. B60N 2/914 |
| DE | 102010007685 | A1 | | 8/2011 | |
| DE | 102010054083 | A1 | | 6/2012 | |
| DE | 102011100341 | A1 | | 10/2012 | |
| DE | 102011113344 | A1 | | 3/2013 | |
| DE | 102014005170 | A1 | | 10/2015 | |
| DE | 102015011129 | A1 | | 3/2017 | |
| DE | 202017101517 | U1 | * | 4/2017 | ........... B60N 2/5891 |
| DE | 102019006162 | A1 | | 3/2021 | |
| DE | 102020105347 | A1 | * | 9/2021 | ............. B29C 65/50 |
| EP | 3378956 | A1 | * | 9/2018 | ........... B60N 2/5866 |
| KR | 20070027286 | A | * | 3/2007 | ............. B21D 39/00 |
| WO | WO-2012025274 | A1 | * | 3/2012 | ........... B60N 2/5891 |

* cited by examiner

METHOD AND DEVICE FOR MOUNTING A HEADREST FOR A VEHICLE SEAT

CROSS-REFERENCE TO RELATED APPLICATIONS

The present application claims priority of DE 10 2022 116 985.5, filed Jul. 7, 2022, the priority of this application is hereby claimed and this application is incorporated herein by reference.

BACKGROUND OF THE INVENTION

The invention relates to a method for the assembly of a headrest.

DE 10 2014 005 170 A1 discloses a device and a method for mounting a leather cover on a head box assembly. A head box shell is wetted with an adhesive and inserted into a device which is movable into an assembly position relative to a support on which a leather cover is arranged. The leather cover is then pulled from the support onto the shell. The shell is inserted into a pressing device, wherein outer areas of the leather are secured by means of a hold-down device. A pressing punch is then pressed against an inner surface of the shell, so that the leather cover is stretched on the shell.

DE 10 2011 100 341 discloses a headrest with a base and a hollow body, wherein a head part of the headrest is made by foaming around the base and the hollow body in a mold and subsequent mounting of a cover.

SUMMARY OF THE INVENTION

According to a first aspect, it was an object of the invention to provide a method in which a large part of the headrest assembly operations are effected in an automated manner.

The method for automatic assembly of a headrest for a vehicle seat comprises the following method steps:

A cover of the headrest to be produced, already mounted in a holder, is provided in a storage and fed from the storage to a conveying device by means of a feeding device. Several holders, each equipped with a cover, can, for example, be delivered inside a storage can be in the type of a box or via a transport belt. The feeding device can, for example, automatically remove the holder from the box. For example, the holder is removed from the storage and placed directly in a designated position of a conveying device. Alternatively, the holder is first transported by the transport belt and transported to a pick-off position. For example, a machine arm grips the holder in the pick-off position and places it in the intended position of the conveying device. The conveying device transports the holder together with the cover attached to it to the individual workstations.

The mechanical removal of parts of the headrest to be produced and the assembly steps are for example carried out by means of suitable mechanical devices such as robots, herein referred to as machine arms. The transport to a provision position is for example effected by means of conveyor belts. These means are known in automation technology. These elements are therefore not explained in detail in the application.

The cover comprises a main opening and is otherwise configured in the type of a pocket. That is, the cover comprises three substantially closed sides, while a fourth side is provided with a slot-shaped opening. An edge region of the opening is held open by the holder in such a way that a head box can be inserted into the cover. For example, the cover is held in an open position at four corner regions of the edge region or on at least two opposite sides of the edge region. For example, fastening means for fastening in each case two pairs of edge regions of the cover opposite one another are formed on the holder. Mating fasteners can be formed on the cover. The fastening means are formed on the holder spaced from one another in such a way that the opening of the cover is held open for mounting components, in particular for mounting the head box.

By means of a feeding device, a pre-assembled head box assembly is fed from a storage to the conveying device and mounted in an inner space of the cover through the opening of the stretched cover. The head box assembly is for example provided with a locking device for an adjustment, such as height adjustment, and, for example, with at least one support rod, e.g. with two individual support rods or a support rod bracket.

Subsequently, the opening is closed by means of a closing device. The closing device comprises, for example, at least one machine arm for closing. Closure means are formed on edge regions of the opening, or the opening is closed by sewing of the edge regions, for example. All suitable means by means of which the opening can be closed can be considered as closure means. These can be, for example, releasable and non-releasable retaining means that can be engaged with one another. After closing the cover, the headrest is fastened to the holder, e.g. by means of a fixing device.

For example, the support rods of the headrest are fixed relative to the holder by means of the fixing device.

Subsequently, the headrest is removed from the holder and from the conveying device. The headrest is placed on a transport device, for example. The holder is also removed from the conveying device. It can be placed on the same or on a separate transport device. The holder is then transported again to an assembly station for fastening the cover to the holder, where it is newly fitted with a cover. The finished headrest is fed to further work steps, such as an ironing process, for example.

For example, the cover is received in the holder such that a plane formed by the edge region of the opening of the cover has a surface orthogonal oriented upward in the vertical direction (z1). In other words, the opening of the cover is oriented upwards, while the cover is suspended downwards from this opening. In this way, automated assembly of the head box assembly can be performed from above. This simplifies assembly, as gravity forces can be utilized in this way, causing the cover to hang down as a flexible component. The head box assembly can be inserted into an inner space of the pocket-like cover.

For example, an upholstered part is transferred through the opening into an inner space of the cover prior to assembly of the head box. In the context of the invention, an upholstered part is a part of any comfort-enhancing, resilient material, such a s a foam part or a lattice component, which can be produced by injection molding or 3D printing. The assembly of the upholstered part is for example necessary, if the head box is not resilient. If the head box is provided with a foam or consists of an EPP (expandable polypropylene), a foam is not necessarily required, for example.

Prior to assembly, the upholstered part is for example arranged on a support. The support can, for example, be at least partially inserted into an inner space of the upholstered part. The support can then, together with the upholstered part, be inserted through the opening into the cover by means of a machine arm.

For example, the support comprises an extraction or vacuumizing device by means of which air can be drawn out of the upholstered part prior to assembly in the cover, thereby reducing the volume of the upholstered part. For this purpose, openings can be formed on the surface of the support by means of which a suction can be applied, for example.

According to an alternative embodiment, the upholstered part is inserted into a mechanical deflator. The latter, for example comprises a channel into which the upholstered part can be inserted via an opening. The opening can for example be closed by means of at least one flap, wherein the upholstered part is compressed in the channel. The channel is then oriented relative to the opening of the cover in such a way, that one end region of the channel is aligned with the opening. From another end region of the channel a plunger presses the upholstered part through the channel into the cover.

According to a further alternative, the upholstered part could also—e.g. after fixing the cover in the holder—be arranged manually in the cover via the opening.

Seams are for example, present on the cover, wherein in the context of this invention all connections of cover edges by means of at least one thread, at least one welded connection or at least one adhesive line are referred to as seam. Free fabric edges are formed from the seam, which in case of non-regular position between the head box and an outer surface of the cover form undesirable irregularities of the cover, which can be visible from the outside. To prevent the free fabric edges between the outer surface of the cover and the head box from forming irregularities, they are laid in one direction with a tool and in this way oriented in a defined manner.

The opening of the cover is automatically closed by means of a closing device. This can be effected, for example, in that closure means attached to the cover are brought into engagement in such a way that the opening is closed. According to a simple solution, areas of the cover are sewn, glued or stapled.

For example, at least one strip is attached to at least one edge region of the opening of the cover for stiffening. For example, at least two opposite sides of the edge region have strips. With such a stiffening of the edge region, the otherwise flexible edge regions of the opening of the cover are easier to handle by machines. For example, it is easier to keep the opening of the cover open in the holder and to close the opening by means of a machine.

For example, the strips have closure means. For example, closure is achieved by bringing-into-engagement, e.g. by clipping, the closure means of oppositely arranged strips. In doing so, closure means are brought into engagement with one another in such a way that the opening is closed.

Prior to mounting the cover to the frame, for example, the at least one strip is mounted to the cover. In particular, the strips are attached to at least two opposite edge regions of the cover which are adjacent to the opening.

For example, actuating means for actuating a locking device are mounted on the head part of the headrest after the head box assembly has been mounted. For example, an opening is already formed in the cover and the head box also comprises an opening. The actuating means, e.g. an actuating button, can then engage through the openings of the cover and the head box and be latched onto an inner side of the head box. The actuating button is e.g. delivered pre-assembled in a storage. A machine arm is used to remove the actuating button from the storage, for example, and insert it into the workpiece.

The fully-assembled headrest is subjected to an ironing treatment, for example, for smoothing the cover. This eliminates small wrinkles or irregularities caused by curvature of the cover. For this purpose, for example, an ironing device is provided, which picks up the fully-assembled headrest and inserts it into a mold in which the head part of the headrest can be subjected to temperature, pressure and steam at suitable parameters for smoothing the cover.

The advantage of the invention is that high assembly numbers with consistent quality can be achieved by means of the method according to the invention.

In accordance with a second aspect of the invention, the invention relates to an assembly device for a headrest for a vehicle seat.

Such an assembly device is known from the prior art mentioned above.

It was the object of the invention to create an assembly device, in which a large part of the work steps for the headrest assembly can be carried out in an automated assembly process.

The device according to the invention for the assembly of a headrest is particularly suitable for carrying out the method according to the invention provided in the first aspect of the invention. Therefore, the features disclosed with respect to the method may also be provided with respect to the apparatus. Vice versa, features disclosed with respect to the apparatus may also be provided with respect to the method according to the invention. The device comprises a conveying device for transporting a holder between several workstations where machining and/or assembly takes place. The conveying device picks up at least one holder and transports it to the individual stations, where it remains for a certain cycle time.

The holder of the device can be inserted into the conveying device and is transported between the workstations by the conveying device. A cover of the headrest is fastened in the holder. The holder is provided with means for holding open an opening of the cover in such a way that an access to an inner space of the cover is formed. The holder is delivered e.g. pre-assembled together with the cover to the assembly device. The cover is for example manually or automatically mounted in the holder. The cover is for example fastened at four points or at least two opposite line fasteners attached to the holder. This type of fastening makes it possible to easily keep the cover open in such a way that components of the headrest, in particular the head box, can later be mounted in the inner space.

A first feeding device is used to feed a holder equipped with the cover to the conveying device and to insert it into a designated position of the conveying device. Insertion into the conveying device can for example be carried out by means of a machine arm. In order for the machine arm to have a defined position for receiving the holder, the holder equipped with the cover can be transported to a pick-up position, e.g. on a transport belt of the feeding device.

Using at least a second feeding device, a pre-assembled head box is supplied to the conveying device and inserted into the cover. The pre-assembled head box can also be transported, for example, to a specific pick-up location by means of a transport device from which a machine arm can grip the head box and insert it into the cover. A locking device and, for example, support rods are mounted at least partially on the head box. The machine arm can grip the head box on at least one support rod, for example.

A closing device closes the opening of the cover. The cover comprises closure means, e.g. at an area adjacent to the opening, for closing the opening. Such closure means are, for example, hooks, eyes, press buttons, clip fasteners, etc. Alternatively, closure means such as brackets, adhesives etc. are also conceivable, which are also supplied.

The finished headrest is removed from the holder as well as from the conveying device using a transport device, and the holder and cover are fed to a common or separate transport device. For example, the holder and the headrest are placed on a common or on separate removal conveyor belts. The empty holder is for example fed to a station at which the holder is equipped with the cover.

With the automatic assembly device, high quantities per time unit and consistently good quality are achievable.

The holder is arranged in the conveying device, for example, in such a way that the orthogonal of a plane formed by the opening is directed substantially upwards (direction z1). In other words, the opening of the cover points upwards, so that the mounting of the head box as well as the other operations can take place from above. This facilitates the following operations and due to gravity, the assembled parts cannot move out of the cover while the workpiece is being conveyed.

According to one embodiment, the assembly device comprises an upholstered part feeding device. This device for example comprises a support which can be positioned in an inner space formed by the upholstered part. With the device, the support can be positioned in the inner space of the cover together with the upholstered part. This method step is for example carried out before the head box is mounted. This is particularly necessary if the upholstered part is configured to be closed in the form of a pocket. In this case, it is no longer possible to mount the upholstered part after the head box has been mounted. According to a special configuration, the support is formed by the head box assembly.

The support includes, for example, an extraction or vacuumizing device for reducing the volume of the upholstered part. This facilitates the insertion of the upholstered part through the opening in the cover. By means of the extraction device, the air is drawn out of the upholstered part so that its volume is reduced. For example, openings are formed on the surface of the support through which air is drawn in. In this way, large-area deflation of the upholstered part is possible. If the support is formed by the head box assembly, auxiliary means might as well be used for venting the upholstered part. Such aids include, for example, a bag-like dense fabric which is pulled over the upholstered part mounted on the head box and from which the air can then be extracted.

According to an alternative solution, the device comprises a mechanical deflator, and the upholstered part can be compressed therein. In this case, the upholstered part can be inserted into a channel in which the upholstered part is mechanically compressed. For example, the compression takes place by closing at least one cover. By means of a plunger, the upholstered part can be pushed out of the channel into the cover, e.g. via an opening of the channel.

The assembly device comprises, for example, a seam orientation device by means of which the at least one edge of the seam of the cover can be laid in a defined direction. An uncontrolled arrangement of the sewn edges may lead to irregularities under the outer surface of the covers that are visible from the outside. These impair the visual appearance and should therefore be avoided. With the seam orientation device, the at least one seam is laid in one direction so that no irregularities occur. The tool can be, for example, a rod tool guided by a machine arm. This device is for example provided upstream with respect to the assembly station of the head box in the assembly device.

The mounting apparatus for example includes an actuating means mounting station, using which an actuating means for actuation of a locking device after mounting of the head box assembly to the head box of the headrest. For example, an opening is already formed in the cover and the head box also comprises an opening. By means of a machine arm, the actuating button is taken out of e.g. a storage and is pressed by openings of the cover and the head box and in doing so is latched.

With an ironing device, for example, the head part of the headrest provided with the cover is subjected to a smoothing process. To this end, the finished headrest is placed in a mold and applied with steam, pressure and temperature. This eliminates slight bulges in the cover and smoothens it.

For example, the cover comprises strips on an area adjacent to the opening, for stiffening the edge regions of the cover. For example, two strips are attached to opposite areas of the opening. Alternatively, two pairs of strips offset by 90° and arranged opposite each other are attached to the cover. The strips stiffen the cover in the edge region of the opening so that the opening can be held open better. No fabric areas of the cover can bulge towards the opening in this way and hinder the mounting of parts in the cover.

In addition, closure means can be provided on the strip. Mechanical closure is also facilitated by the strips because the areas adjacent to the opening are not flexible.

For example, the holder comprises fastening means for the cover for fastening the cover or auxiliary means of the cover, such as at least one strip, to the holder. E.g. the auxiliary means and the holder have cooperating fasteners. For example, the strip comprises mating fasteners that cooperate with the fastening means of the holder.

For example, the fastening means are formed on the holder in such a way that the cover is held open when secured in the holder. Mating fasteners on the cover or an auxiliary means, are for example arranged on the edge region of the opening in such a way that spaced-apart fastening means hold the cover open when the fastening means and the mating fasteners are in engagement.

For example, the strips comprise the mating fasteners for attachment to the holder.

For example, the mating fasteners are at the same time the closure means for closing the opening of the cover. In other words, the mating fasteners have a dual function, and it is not necessary to provide separate elements as mating fastener and closure means.

Exemplary embodiments of the invention are described by way of example in the following description of the Figures, also with reference to the drawings. For the sake of clarity, identical or similar parts or elements or areas are designated with the same reference characters, sometimes with the addition of minor-case letters, even where different exemplary embodiments are concerned.

Within the scope of the invention, features described only in relation to one exemplary embodiment may also be provided in any other exemplary embodiment of the invention. Such modified exemplary embodiments—even if they are not illustrated in the drawings—are also within the scope of the invention.

All disclosed features are per se essential to the invention. The disclosure of the application hereby also includes in its entirety the disclosure content of the cited documents and the described devices of the prior art, also for the purpose of including individual or several features of these documents into one or several claims of the present application.

DETAILED DESCRIPTION OF THE INVENTION

Figure 1:
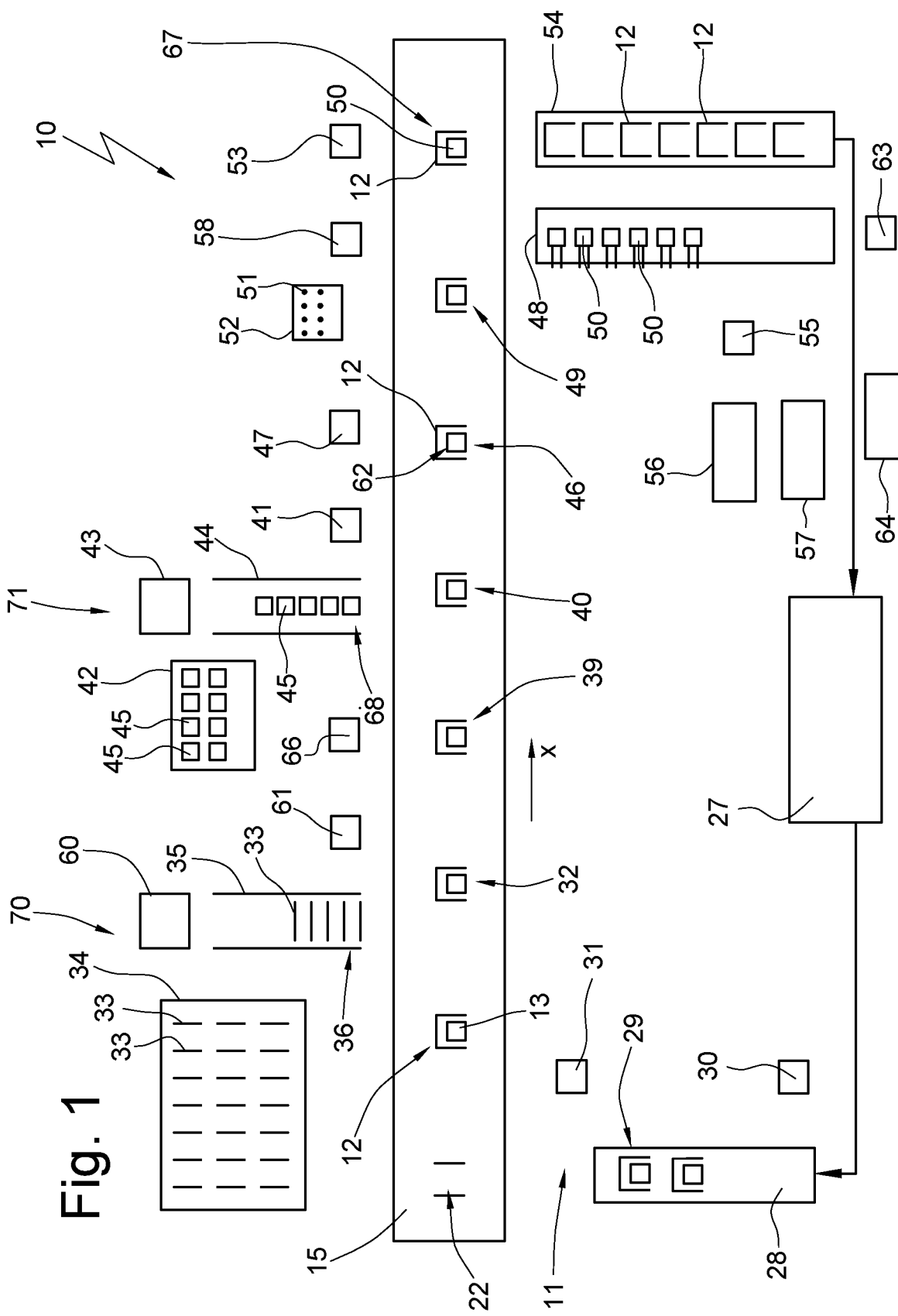
FIG. 1 a top view of an assembly line for automatic assembly of a headrest.

An assembly device for automatically assembling a headrest 50 as a whole is denoted by reference character 10 in the Figures.

According to FIG. 1, the assembly device 10 comprises a first feeding device 11 with which a holder 12 for holding a cover 13 is taken out of a storage 27 and inserted into a free receptacle 22 of a conveying device 15. The storage 27 already contains pre-assembled holders 12 to which the cover 13 is already attached. In the present example, the holder 12 is initially arranged on a transport device 28 by a machine arm 30 and starting therefrom, is transported to a pick-off position 29, a machine arm 31 can pick up the holder 12 with the cover 13 attached to it from the pick-off position 29 and insert it into the receptacle 22.

Figure 2A:
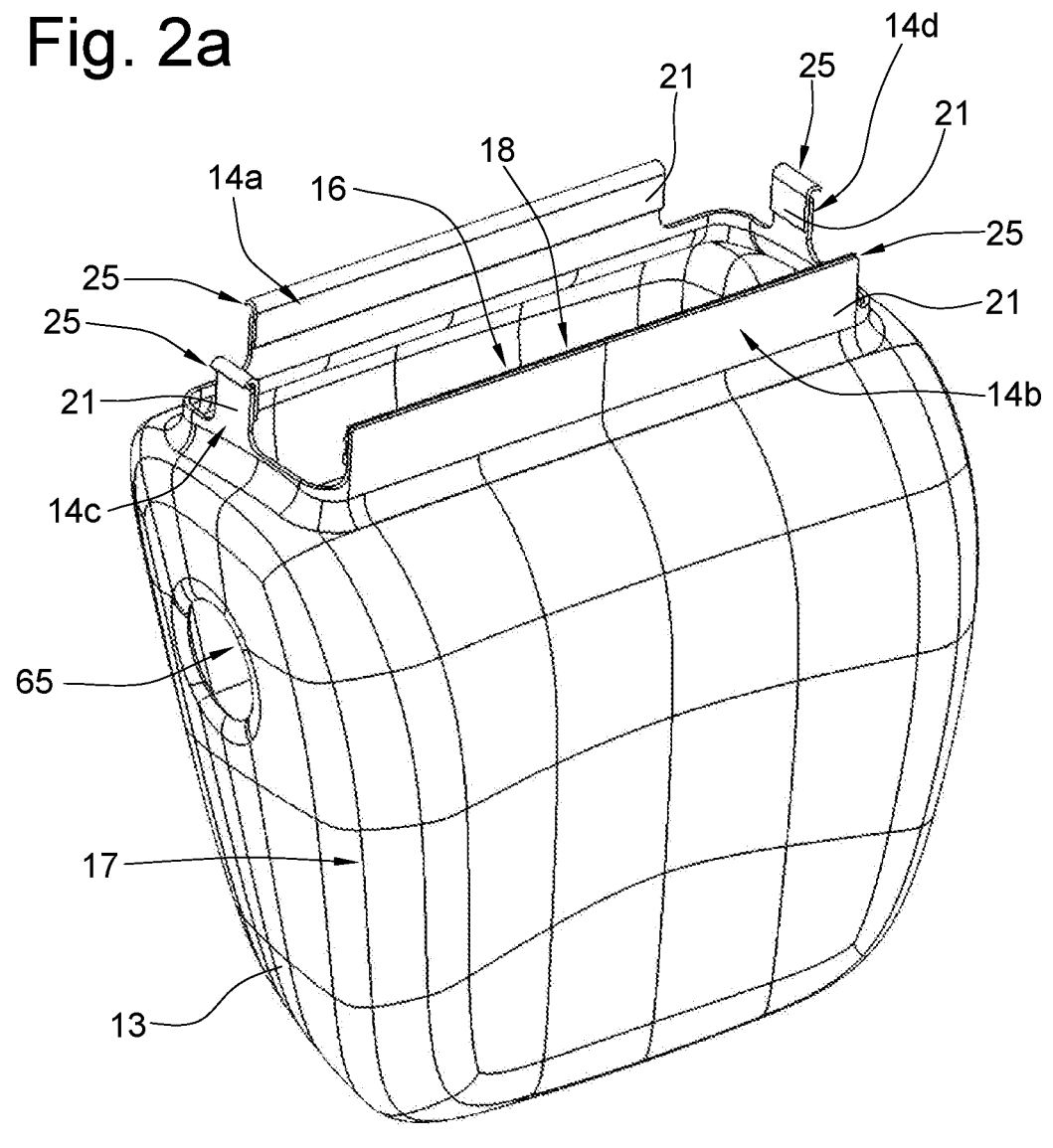
FIG. 2a a perspective view of a cover of the headrest.
Figure 2B:
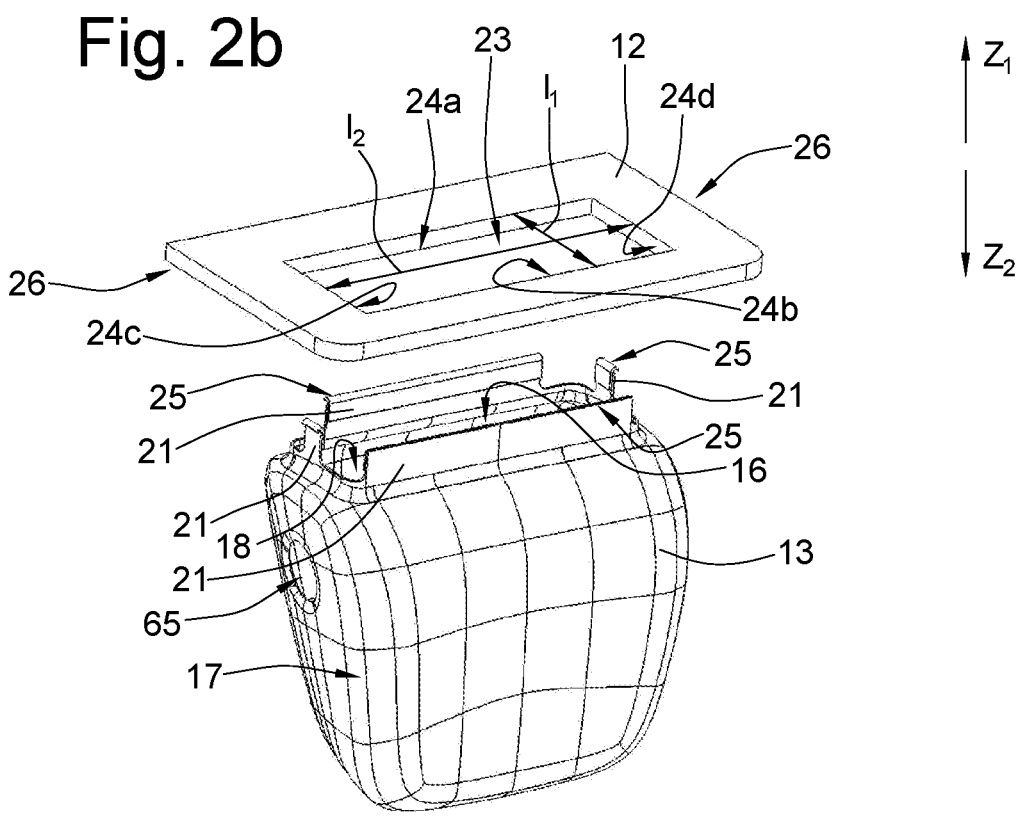
FIG. 2b a perspective view of a holder of the assembly device for holding the cover, and a cover, FIG. 3 a perspective view of the holder with mounted cover, FIG. 4a a perspective view of a first embodiment of the assembly station for the assembly of the upholstered part, wherein the upholstered part is vacuumed in a deflation device, FIG. 4b a perspective view of a second embodiment of a mechanical deflation device, wherein an ejector is not shown, FIG. 4c in relation to FIG. 4b, the deflation device with an ejector, FIG. 4d the device according to FIG. 4c, wherein a cover is attached to the device, FIG. 5 a schematic top view of a seam with non-oriented seam edges, FIG. 6 a top view of the seam according to FIG. 9, wherein the seam edges are oriented, FIG. 7 a perspective illustration of an assembly comprising a head box with locking device and support rods, FIG. 8 a perspective illustration of the assembly according to FIG. 5, with the assembly in an assembly position, FIG. 9 a perspective view of an ironing device.
Figure 3:
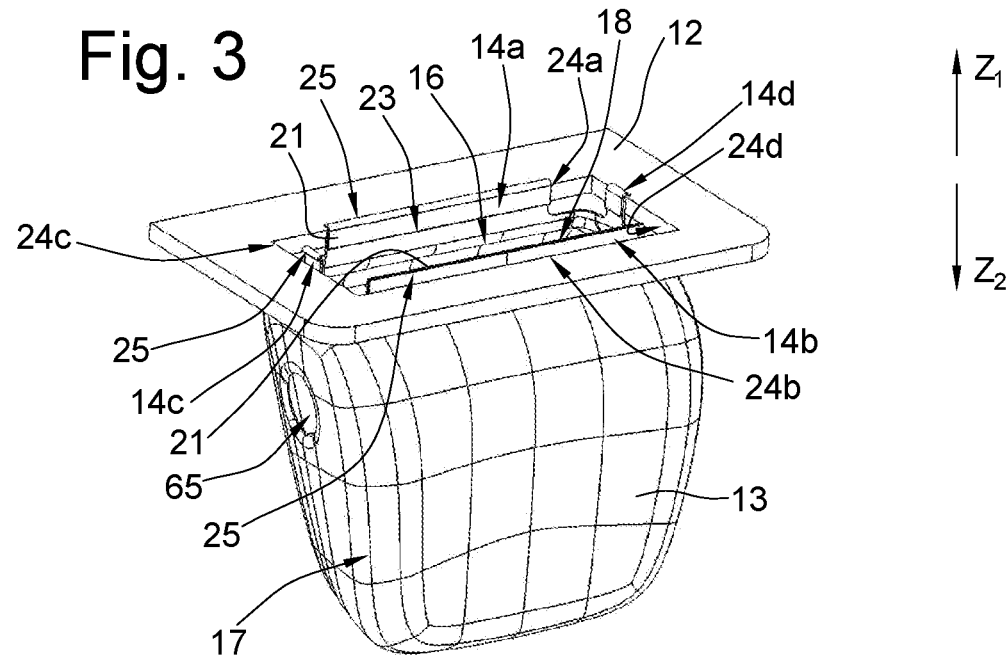

FIG. 2a shows the cover 13 and FIG. 2b shows the holder 12 with the cover 13 not yet attached. FIG. 3 shows the assembly group of holder 12 and cover 13 attached to it.

As can be seen in FIGS. 2a, 2b and 3, the cover 13 comprises an opening 16. The cover 13 comprises a plurality of cuttings connected to one another by at least one seam 17 to form a pocket shape with an inner space 18, into which a pre-assembled head box assembly, comprising a head box provided with support rods 19a and 19b and a locking device can be inserted through the opening 16.

Adjacent to the opening 16, strips 21 are secured to the cover 13 and are configured for stiffening edge regions of the cover 13 adjacent to the opening 16 and further include closure means 25 adapted to close the opening 16. In the present example, strips 14a and 14b are attached to the cover 13 on opposite longitudinal sides of the opening 16 and strips 14c and 14d are attached to the cover 13 on opposite narrow sides of the opening 16.

The holder 12 comprises fastening means 24a and 24b opposite one another with respect to a recess 23, with which the closure means 25 of the strips 14a and 14b can be fastened to the holder 12. Fastening elements 24c and 24d are also formed on side regions 26 of the holder 12, which can be engaged with the closure means 25 of the strips 14c and 14d.

The fastening means 24a and 24b are spaced from one another by a length 11 and the fastening means 24c and 24d are spaced from one another by a length 12. The lengths 11 and 12 are selected to span the opening 16 sufficiently wide open to allow the head box 20 of the headrest 50 to be displaced through the opening 16 into the inner space 18.

The cover 13 is fixed in the holder 12, for example, in such a way that the opening 16 points upwards in the direction z1. In this way, the components of the headrest 10 that are arranged within the cover 13 can be mounted more easily.

The recess 23 in the holder 12 is formed in such a way that the head box 20 can pass through it during assembly. The conveying device 15 transports the holder 12 in the direction x to a station 32 for the mounting of an upholstered part 33. In an alternative embodiment of the method, the mounting step of mounting an upholstered part 33 can as well be omitted. This is the case, for example, if the upholstered part 33 has been mounted in advance on the head box 20 or the head box 20 has been previously foamed over, for example. Alternatively, the head box 20 could also comprise an expandable polypropylene (EPP), so that no upholstered part or foam is necessary.

Figure 4A:
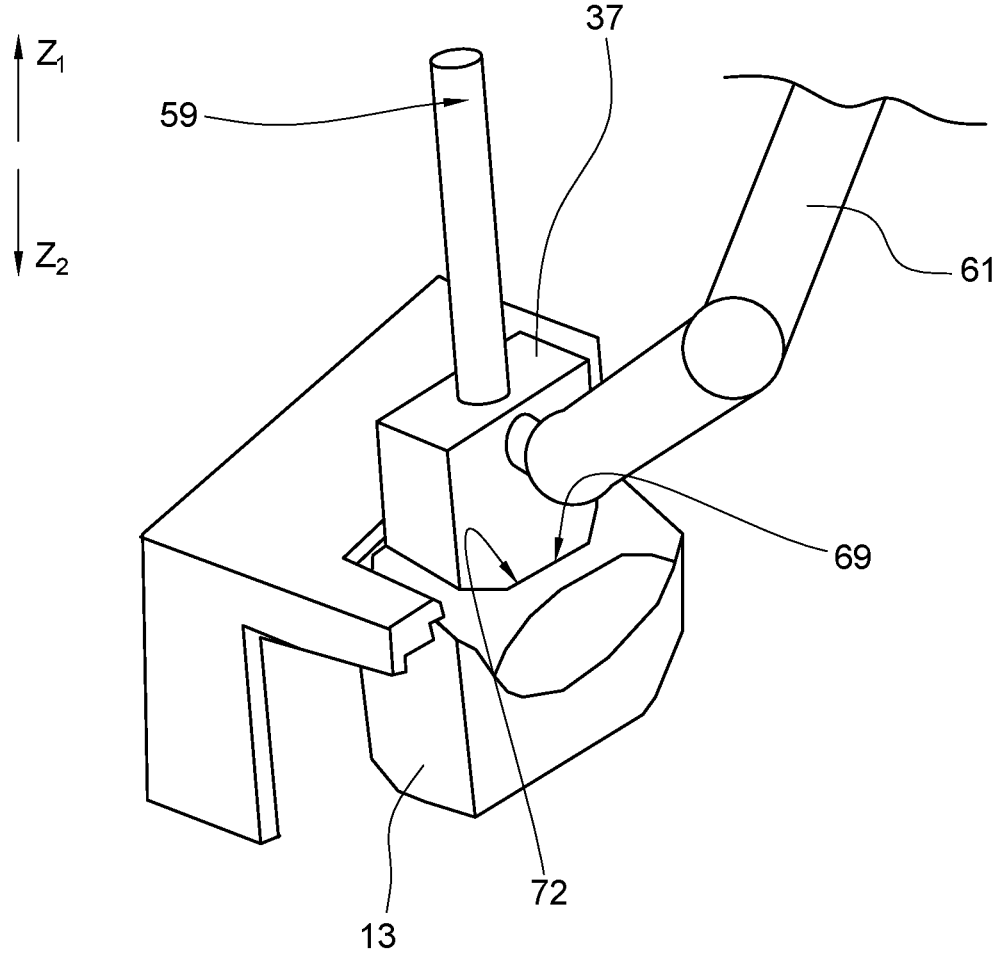

By means of a feeding device 70, upholstered parts 33 are taken out from a storage 34 and brought into a pre-assembly position 36. In this exemplary embodiment, pre-produced upholstered parts 33 are fed from the storage 34 to a transport device 35 by means of a machine arm 60, which conveys the upholstered part 33 into the position 36. In position 36, the upholstered part 33 can be applied to a support 37 movable by means of a machine arm 61 (see FIG. 4a), e.g. by moving the support 37 into an inner space 69 of the upholstered part 33. An opening 72 to the inner space 69 of the upholstered part 33 points in the position 36, e.g. upwards in the direction z1. According to an alternative embodiment, the support may also be formed by a head box assembly 45 comprising the head box, support rods 19a and 19b, and optionally a locking device.

For example, the support 37 includes a suction device 59 that allows to deflate the upholstered part 33 so that its volume is reduced and assembly in the cover 13 is facilitated. The machine arm 61 is used for picking up the support 37 with the upholstered part 33 from the assembly position 36, and the support 37 is partially inserted into the inner space 18 in the direction z2 in such a way that the upholstered part 33 is arranged in the cover 13 and arranged in the desired position. Thereupon, the deflation of the upholstered part 33 is terminated, whereupon it assumes its original volume due to its elastic restoring force. The support 37 can then for example be moved in the direction z1, wherein the upholstered part 33 remains in the cover 13.

Alternatively, the vacuumizing of the upholstered part can also be carried out at a in a stationary vacuumizing device, wherein a machine arm removes the vacuumed upholstered part 33 from the device and inserts it into the inner space 18 of the cover 13.

Figure 4B:
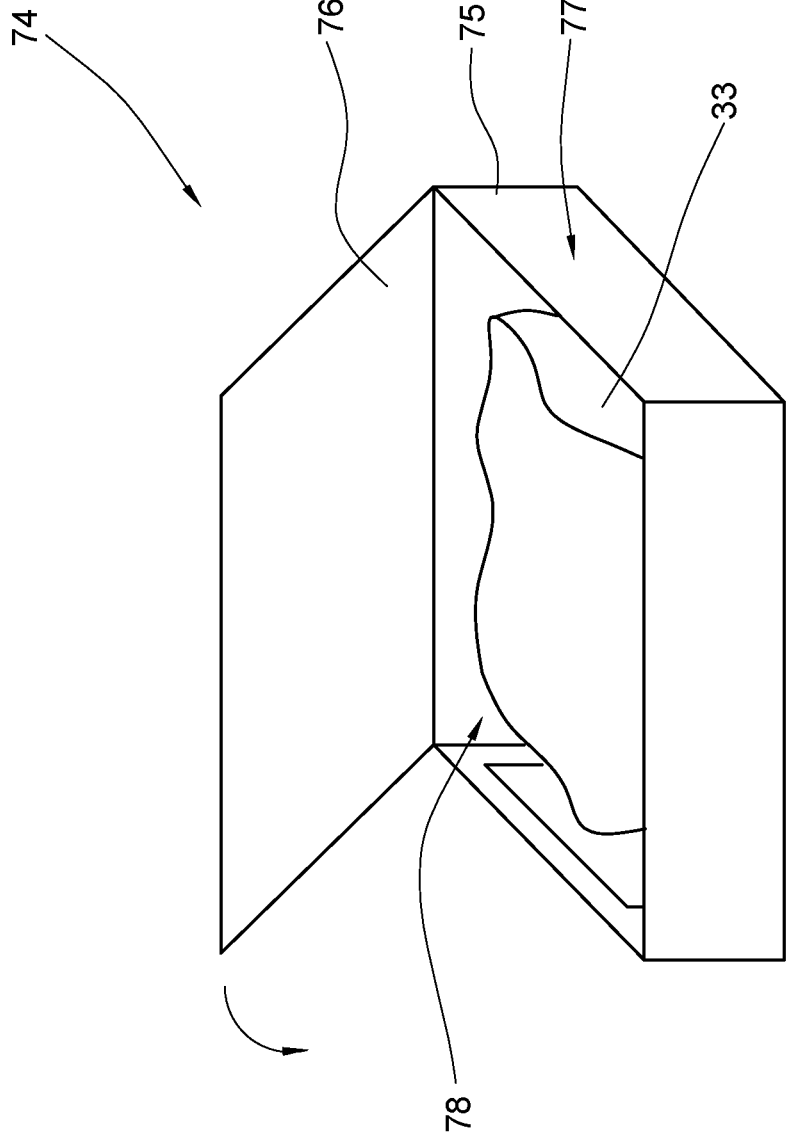
Figure 4C:
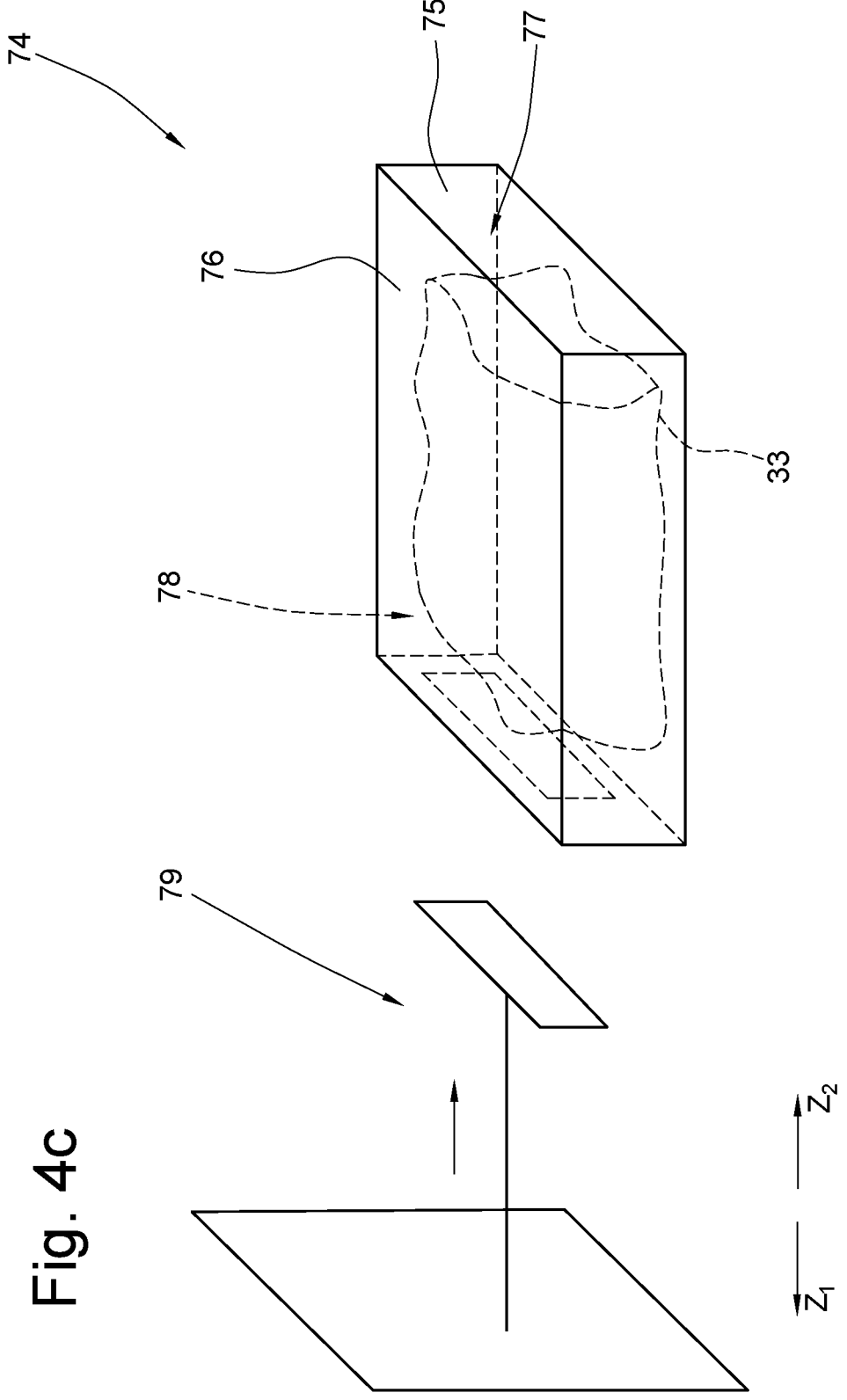
Figure 4D:
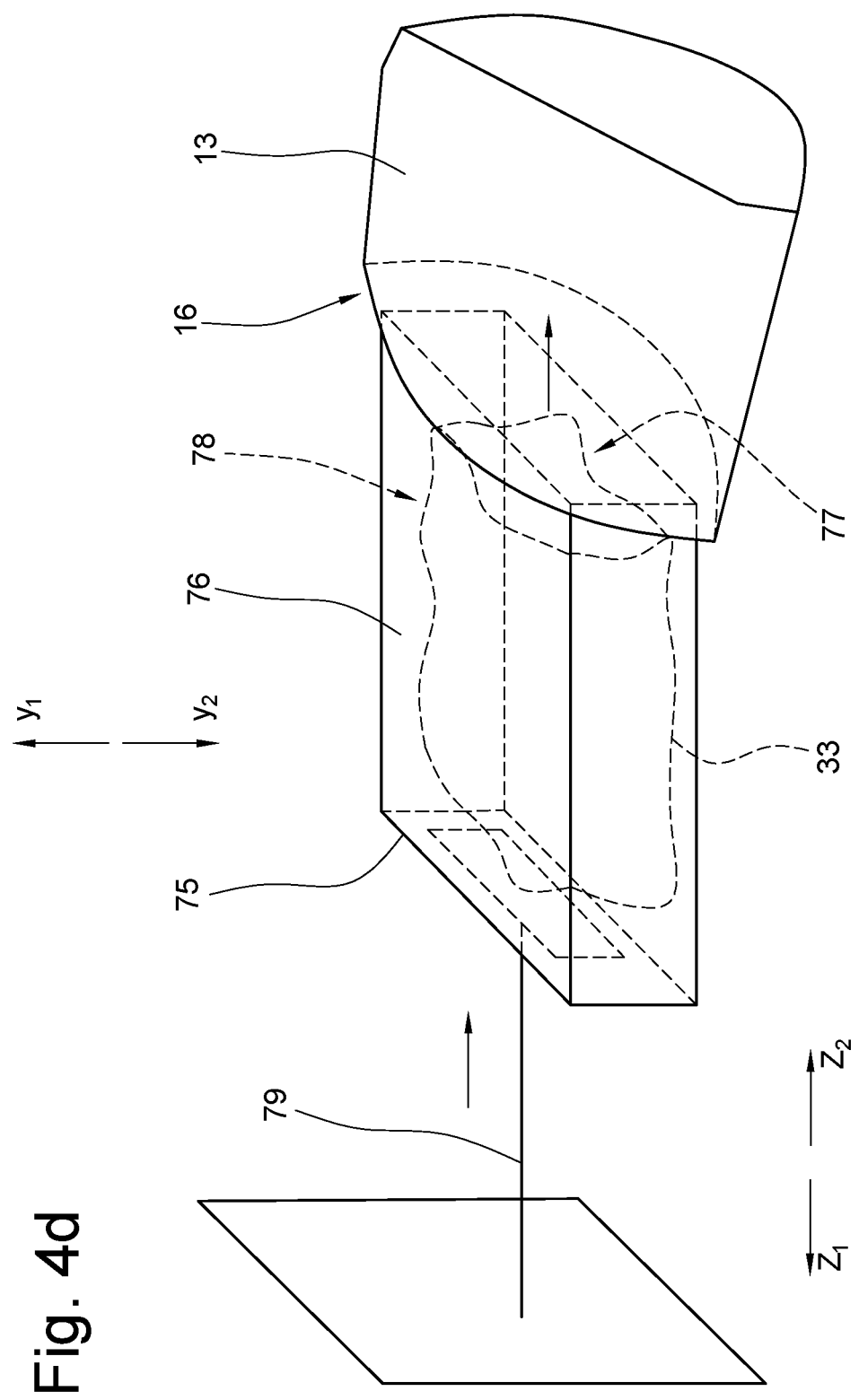
Figures 5, 6:
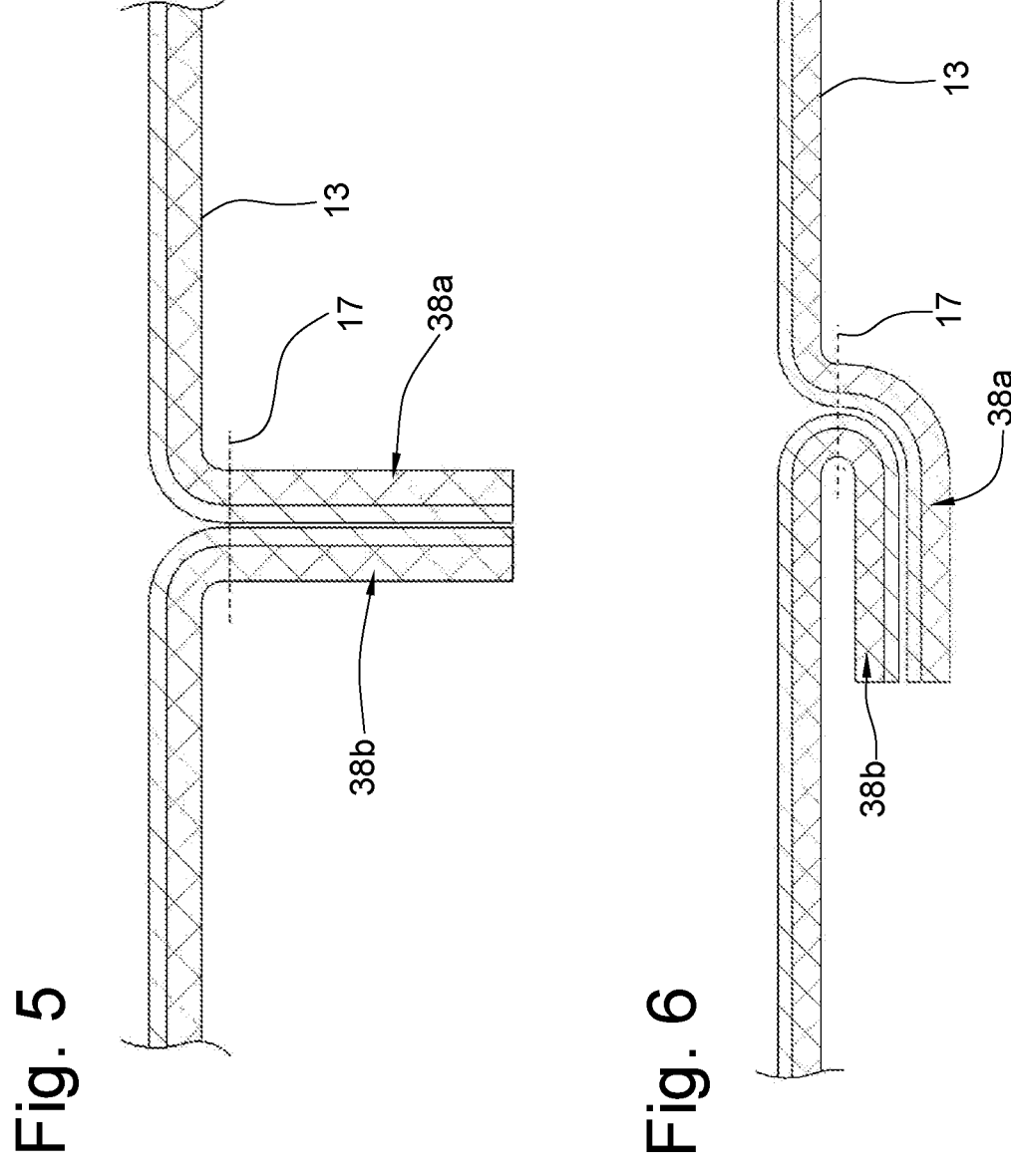

According to an alternative embodiment, the upholstered part 33 could also be compressed by means of a mechanical compression device and then automatically inserted into the cover 13 by means of a machine arm (see FIGS. 4b, 4c and 4*d*). For example, a mechanical deflator 74 comprises a chamber 75 with a lid 76 and an opening 77 (see FIG. 4*b*). The upholstered part 33 is inserted into an inner space 78 of the chamber 75. When the lid 76 is closed, the upholstered part 33 is compressed (see FIG. 4*c*). Alternatively, instead of using the lid 76 to reduce the volume of the upholstered part 33, other means may be used to reduce the inner space 78 of the chamber while compressing the upholstered part 33.

The chamber 75 can be arranged relative to the opening 16 of the cover 13 by means of a machine arm (not shown), wherein the opening 16 points upwards in the direction z1 according to the direction arrows in FIG. 4*d*. The compressed upholstered part 33 is displaced through the opening 77 into the inner space 18 of the cover 13 by means of an ejector 79.

According to a further alternative, also mechanical compression of the upholstered part 33 by machine is considered, wherein the compressed upholstered part 33 is removed from the locally fixed compressing device by means of a machine arm and mounted in the cover 13.

Figure 9:
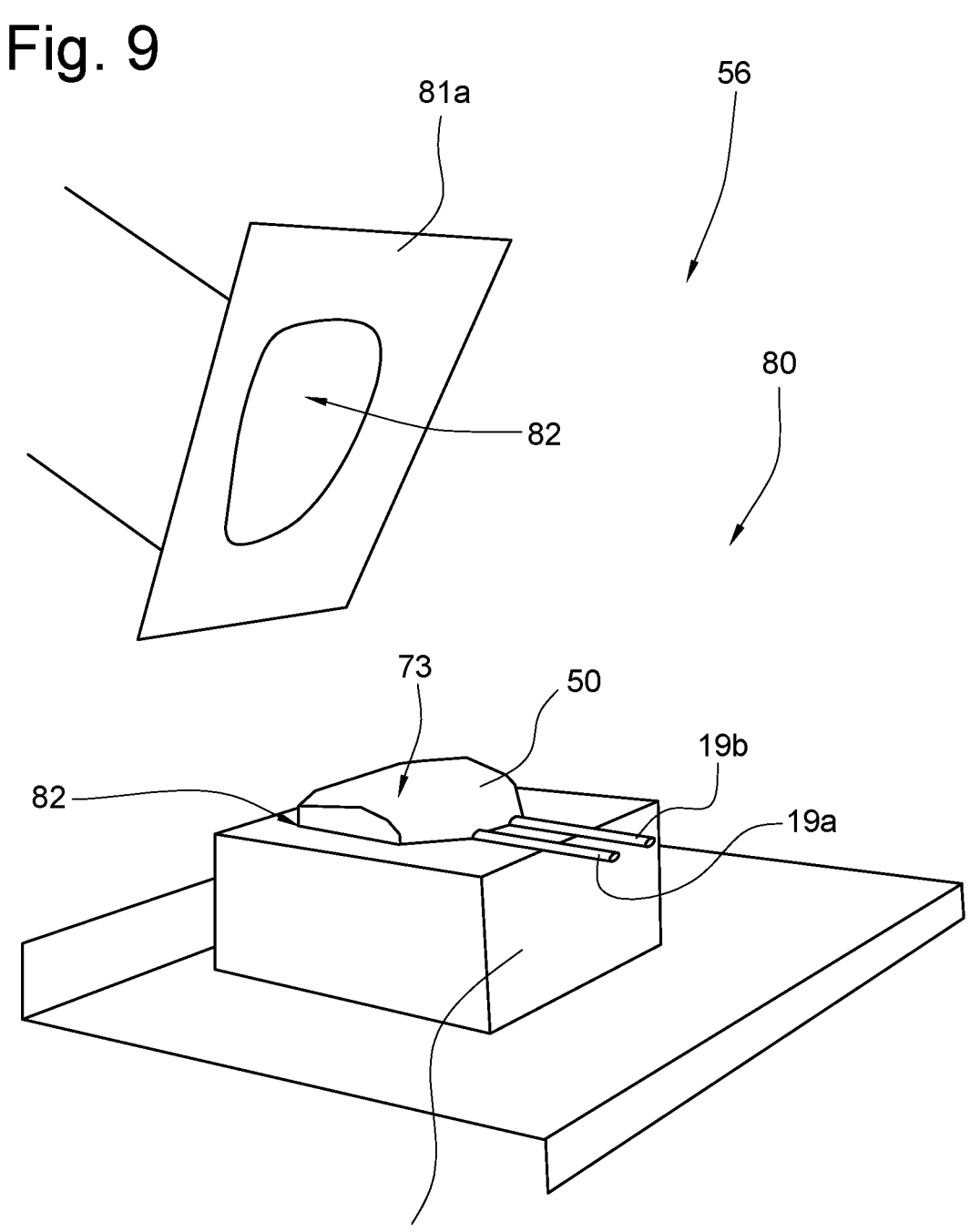

To prevent the free fabric edges 38*a* and 38*b* of the cover 13, which were created by the seams 17, from lying in an uncontrolled manner, which may be visible from the outside, with the free fabric edges 38*a* and 38*b* are oriented at a station 39 by means of a tool (not illustrated) by a machine arm 66 (see FIGS. 9 and 10)

Figures 7, 8:
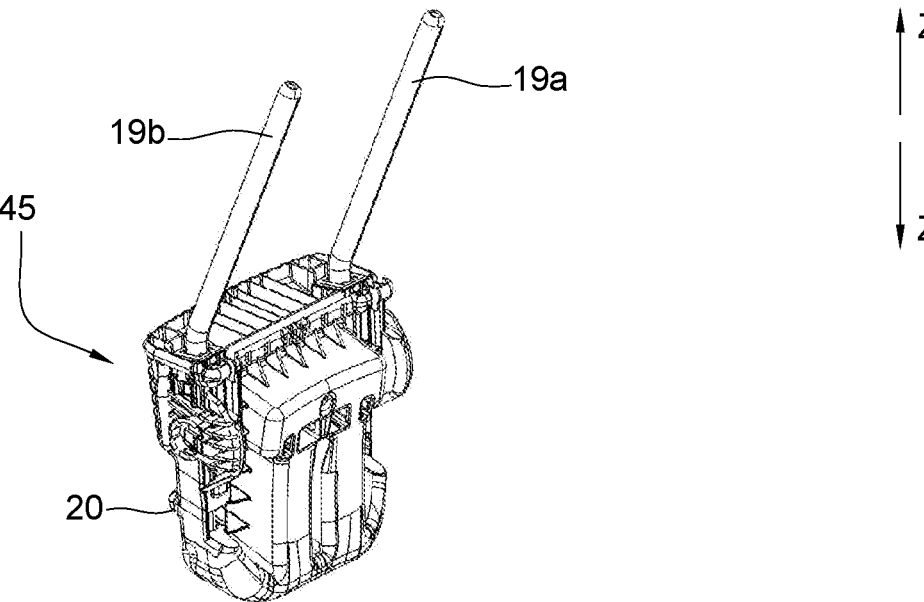

In a following working step, the assembly 45 (see FIGS. 7 and 8) of the head box 20 together with the support rods 19*a* and 19*b* and the locking device is inserted into the inner space 18 of the cover 13 in the direction z2 by a machine arm 41 through the opening 16 in such a way that the head box 20 is located inside the upholstered part 33 and the support rods 19*a* and 19*b* project out of the opening 16.

The assembly 45 is pre-assembled and provided in a storage 42 and moved to a pick-off position 68 by a feeding device 71. In this example, a machine arm 43 picks-off the assembly 45 from the storage 42 and places it in a predetermined orientation in which, for example, the head box 20 is directed downwards and the support rods 19*a* and 19*b* are directed upwards in the direction z1 (see FIG. 8), on a transport device 44. In the pick-off position 68, the machine arm 41 can pick up the assembly 45 and mount it in the cover 13 as described above.

The assembly 62, comprising the assembly 45, the upholstered part 33 and the cover 13, is then conveyed by the conveying device 15 to a station 46, at which the opening 16 is closed by means of the closure strips 21 by bringing the closure means 25 of oppositely-arranged strips 14*a* and 14*b* into engagement. In the present exemplary embodiment, a machine arm 47 is provided for closing the opening 16, but alternatively multiple machine arms 47 may be present at one station 46 or at multiple stations for this purpose.

The assembly 62 is then conveyed by the conveying device 15 to a station 49, at which an actuating means 51 is inserted into the assembly 62 by means of a machine arm 58 to actuate the locking device. The actuating means 51 is picked-off from a storage 52. In this example, the actuating means 51 is formed by a pre-assembled button device, which is guided through a recess 65 of the cover 13 (see FIG. 2*a*) and into a recess 83 in the head box 20 and latched.

By means of the conveying device 15, the headrest 50 including the pushbutton 51 is conveyed to a station 67. A machine arm 53 picks off the headrest 10 from the holder 12 and places it on a transport device 48. The empty holder 12 is placed on a transport device 54 by the machine arm 53.

For a subsequent ironing process in which a head part 73 of the fully-assembled headrest 50 is subjected to heat treatment, a machine arm 55 picks-off the headrest 10 from the transport device 48 and places it in an ironing device 56. The ironing device 56 (see FIG. 9) comprises, for example, a mold 80 with mold parts 81*a* and 81*b* and a recess 82 which is formed in both mold parts 81*a* and 81*b* and in which the headrest 50 can be at least partially accommodated. In the ironing device 56 the head part 73 can in each case be applied with pressure, steam and temperature for a predetermined time for smoothing. The operating parameters temperature, time of ironing treatment, contact pressure between the mold parts 81*a* and 81*b*, and steam are thereby adjustable for optimizing the result. After completion of the ironing process, the finished headrest 10 is placed in a storage 57 by the machine arm 55.

A machine arm 63 removes the empty holders 12 from the conveying device 54 and places them in a storage 64.

The storage 64 is then moved to a station (not illustrated), at which the cover 13 is mounted in the holder 12. From there, the covers 13 mounted in the holder 12 are returned to the storage 27 again.

The invention claimed is:

1. A method for semi-automated assembly of a headrest for a vehicle seat, comprising the steps of:
   feeding a cover stretched in a holder of the headrest to a conveying device, which cover comprises an opening, so that an edge region of the opening is held open by the holder so that a head box is insertable into an inner space of the cover;
   transporting the holder using the conveying device to at least one workstation;
   automatically inserting a head box assembly into the inner space of the cover by a feeding device;
   closing the opening of the cover with a closing device;
   removing the headrest from the holder with a transport device; and
   removing the holder from the conveying device by the transport device.

2. The method according to claim 1, including arranging the holder in the conveying device so that the opening in the cover is directed upwards in a vertical direction.

3. The method according to claim 1, further including inserting an upholstered part into in the inner space before mounting to the head box assembly.

4. The method according to claim 3, including arranging the upholstered part on the head box assembly or on a separate support prior to assembly.

5. The method according to claim 3, including reducing volume of the upholstered part before mounting in the cover.

6. The method according to claim 1, further including orienting at least one seam of the cover using a tool.

7. The method according to claim 1, further including mounting closure strips adjacent to the opening at oppositely arranged edge regions of the opening, and closing the opening by bringing closure means of the closure strips into engagement.

8. The method according to claim 7, including mounting the closure strips on the cover before the cover is mounted on the holder.

9. The method according to claim 1, including mounting an actuating means to a head part of the headrest after the head box assembly is mounted.

10. The method according to claim 1, further including subjecting the fully-assembled headrest to an ironing process using an ironing device to smooth the cover.

11. A device for assembly of a headrest, comprising: a conveying device for transporting a workpiece to at least one workstation with a holder for fastening a cover; an apparatus for keeping an opening of the cover open; at least one first feeding device for feeding the holder equipped with the cover from a storage into the conveying device; at least a second feeding device for feeding a pre-assembled head box assembly to the conveying device and for mounting in an inner space of the cover; at least one closing device for closing the opening of the cover; and at least one transport device by which the headrest is separated from the holder and the holder and the headrest are placed on at least one transport device.

12. The device according to claim 11, wherein the holder is arranged in the conveying device so that the opening of the cover is directed substantially upwards.

13. The device according to claim 11, further comprising an upholstered part feeding and mounting device operatively configured to position an upholstered part in the inner space of the cover.

14. The device according to claim 13, wherein the uphol-stered part feeding and mounting device is configured to position the upholstered part on a head box assembly prior to being mounted in the cover.

15. The device according to claim 13, further comprising a vacuum device or a mechanical deflation device operative to reduce volume of the upholstered part.

16. The device according to claim 11, further comprising a seam orientation device configured to lay at least one cover edge of a seam of the cover in a defined direction.

17. The device according to claim 11, further comprising an actuating means mounting station configured to latch an actuator to a head box through an opening formed in the cover.

18. The device according to claim 11, further comprising an ironing device configured to apply heat, steam and pressure for a defined time to a head part of the fully-assembled headrest so as to smooth a surface of the head part.

19. The device according to claim 11, wherein the cover on at least one region adjacent to the opening comprises strips for stiffening.

20. The device according to claim 19, wherein the strips have closure means.

21. The device according to claim 20, wherein the strips comprise means for fastening to the holder.

22. The device according to claim 21, wherein the means for fastening to the holder are also the closure means.

23. The device according to claim 11, wherein the holder comprises fastening means for the cover.

24. The device according to claim 23, wherein the fastening means are configured so that the cover is held open when accommodated in the holder.

* * * * *